United States Patent
Tsai et al.

(10) Patent No.: US 6,348,765 B1
(45) Date of Patent: Feb. 19, 2002

(54) SYCHRONOUS SWITCHING DEVICE FOR FLUORESCENT LAMP

(75) Inventors: Kuang-Lung Tsai; Chun-Hui Tsai, both of Hsinchu; Shih-Hsien Lin, Hsinchu Hsien; Chie-Ching Lin; Lai-Cheng Chen, both of Hsinchu, all of (TW)

(73) Assignee: Delta Optoelectronics, Inc., Hsinchu (TW)

( * ) Notice: Subject to any disclaimer, the term of this patent is extended or adjusted under 35 U.S.C. 154(b) by 0 days.

(21) Appl. No.: 09/628,216

(22) Filed: Jul. 28, 2000

(30) Foreign Application Priority Data

Mar. 13, 2000 (TW) ......................................... 89104493 A

(51) Int. Cl.$^7$ ............................................... G09G 3/10
(52) U.S. Cl. .................. 315/169.1; 315/56; 315/169.3; 313/483; 313/494
(58) Field of Search ...................... 315/8, 169.1, 169.3, 315/56; 313/483, 494

(56) References Cited

U.S. PATENT DOCUMENTS 5,304,895 A * 4/1994 Ujihara .................... 315/169.3
6,140,774 A * 10/2000 Mori et al. .................. 315/315
6,278,421 B1 * 8/2001 Ishida et al. .................. 345/63

\* cited by examiner

Primary Examiner—Don Wong
Assistant Examiner—Jimmy T. Vu
(74) Attorney, Agent, or Firm—J.C. Patents

(57) ABSTRACT

A synchronous switching device. The switching device includes a common electrode, distributed electrodes, voltage converters and a signal generator. The distributed electrodes are aligned in a straight line facing the common electrode. Each distributed electrode has a length smaller than the common electrode. Each voltage converter is electrically coupled to the common electrode as well as one distributed electrode. All voltage converters are electrically coupled to the signal generator. A first panel, a second panel and two side panels together form a planar lamp with a hollow space inside. A layer of fluorescent coating is deposited on the interior surface of the first and the second panel. The distributed electrodes and the common electrodes are mounted on each side of the hollow space. Through high voltage synchronous signals generated by the signal generator and the voltage converters, the planar fluorescent lamp is lit.

10 Claims, 3 Drawing Sheets

SYCHRONOUS SWITCHING DEVICE FOR FLUORESCENT LAMP

CROSS-REFERENCE TO RELATED APPLICATION

This application claims the priority benefit of Taiwan application serial no. 89104493, filed Mar. 13, 2000.

BACKGROUND OF THE INVENTION

1. Field of Invention

The present invention relates to a synchronous switching device for fluorescent lamp. More particularly, the present invention relates to a synchronous switching device for controlling the lighting of a planar fluorescent lamp at the back of a large area liquid crystal display (LCD).

2. Description of Related Art

Liquid crystal display (LCD) is a high image quality, small volume, lightweight, low voltage driven and low power consumption image-displaying device. Nowadays, liquid crystal display (LCD) panels are widely adopted in portable televisions, mobile telephones, camera recorders, notebook computers, desktop computers as well as projectors. In fact, the conventional cathode ray tube (CRT) is gradually being replaced by LCD as the mainstream display device. However, liquid crystal display differs from other display devices such as plasma display panels (PDP), electro-luminescent (EL) displays, and light-emitting diodes (LED) in that the panel does not emit light. An external light source must be available to illuminate the LCD panel. Hence, most LCD panel needs to include a back light at the back of the panel.

Typically, the back light of a LCD panel is a linear fluorescent tube having a diameter between 1.8 mm to 2.6 mm. The linear fluorescent tube has two electrodes, one at each end of the tube, with fluorescent powder coated on the interior sidewall. The interior space of the fluorescent tube is filled with mercury vapor and inert gas. The fluorescent lamp operates by applying a voltage across the two electrodes, thereby leading to an electrode discharge and the production of plasma that emits ultraviolet radiation. When the fluorescent powder coated on the interior sidewalls of the fluorescent tube is activated by ultraviolet radiation, visible light is produced.

As area of a LCD panel increases, a uniformly lit panel capable of serving as a back lighting source is more urgently needed. Since linear fluorescent tubes are incapable of providing planar illumination, special planar fluorescent lamps have been designed. FIGS. 1A and 1B are the respective front view and the cross-sectional top view of a conventional planar fluorescent lamp. As shown in FIGS. 1A and 1B, the planar fluorescent lamp 100 includes surface panels 102a and 102b that are parallel to each other. Side panels 102c are inserted between and near the edges of the panels 102a and 102b. The surface panels 102a, 102b and the side panels 102c together form a fluorescent tube 102 enclosing a hollow space 104. Fluorescent layers 106 are formed on the interior sidewalls of the surface panels 102a and 102b, respectively. A first electrode 108a and a second electrode 108b are installed inside the hollow space 104 close to each side panel 102c.

As surface area of the planar fluorescent lamp 100 increases, overall length of the first electrode 108a and the second electrode 108b must increase correspondingly. Due to their increased length, a voltage applied to the two electrodes 108a and 108b may not simultaneously equalize to the same potential level at every point along the entire length instantaneously. Since electric discharge follows the smallest impedance line type route between the electrodes, a line type discharge similar to a linear fluorescent lamp is produced. Hence, the intended uniform fluorescent panel for lighting a large LCD panel is not actually produced.

FIG. 2 is a front view showing the internal structure of another conventional planar fluorescent lamp. The planar fluorescent lamp in FIG. 2 is very similar to the one shown in FIGS. 1A and 1B; hence identical parts are label with the same numerals. The planar fluorescent lamp 200 has sidewall panels 102c inserted between the surface panels 102a and 102b near the edges. The surface panels 102a, 102b and the side panels 102c together form a hollow space 104. Fluorescent layers 106 are formed on the interior sidewalls of the surface panels 102a and 102b, respectively. An equal number of first electrodes 208a and second electrodes 208b are installed inside the hollow space 104 close to each side panel 102c.

To operate the planar fluorescent lamp shown in FIG. 2, each pair of first electrode 208a and second electrode 208b must be applied synchronous identical voltage so that each pair of electrodes inside the fluorescent tube 102 emits light concurrently. Otherwise, only one pair of electrodes will carry out an electrical discharge similar to the discharge of a linear fluorescent tube. In addition, when an external voltage is applied to various electrode pairs, electric arcs may form between adjacent electrodes leading to mutual interference.

Sequential timing control can be applied to the electrode pairs inside the planar fluorescent lamp so that each electrode pair discharge in turn similar to the horizontal scanning of a cathode ray tube. However, overall brightness attained by the planar fluorescent lamp is greatly reduced compared with a planar fluorescent lamp formed by joining a series of parallel linear fluorescent tubes.

Nevertheless, although a series of fluorescent tubes on a planar panel is capable of having a higher brightness level, a diffusion panel must be inserted between the fluorescent panel and the LCD panel to equalize brightness level across the panel. Moreover, when the planar fluorescent lamp is too close to the LCD panel, layout of the fluorescent tubes inside the lamp may appear on the LCD panel, thereby affecting image quality. On the other hand, if the distance between the planar fluorescent lamp and the LCD panel is increased, overall thickness of the LCD panel and the fluorescent lamp will increase thereby adding weight and volume to the panel.

SUMMARY OF THE INVENTION

Accordingly, one object of the present invention is to provide a synchronous switching device for lighting the planar fluorescent lamp at the back of a large surface liquid crystal display (LCD) panel. A voltage signal is transmitted to the synchronous switching device. The switching device generates synchronous voltage signals and which then pass to a plurality of voltage converters where the voltage signals are amplified. The amplified synchronous signal is fed to the common electrode and a plurality of distributed electrodes inside the planar fluorescent lamp so that the lamp is switched on synchronously and arcing between electrodes is suppressed. Hence, the entire planar fluorescent lamp lights up to obtain a high brightness level and uniform light source.

To achieve these and other advantages and in accordance with the purpose of the invention, as embodied and broadly described herein, the invention provides a synchronous switching device. The switching device includes a common electrode, a plurality of distributed electrodes, a plurality of voltage converters and a signal generator. The distributed electrodes are aligned on a straight line facing the common electrode. Each the distributed electrode has a length smaller than the common electrode. Each voltage converter is electrically coupled to the common electrode as well as one and only one distributed electrode. All voltage converters are electrically coupled to signal generator.

According to a second embodiment, this invention provides a planar fluorescent lamp. The planar fluorescent lamp includes a first panel, a second panel, two side panels, two fluorescent layers, a common electrode, a plurality of distributed electrodes, a plurality of voltage converters and a signal generator. The first and the second panel are parallel to each other with side panels between the first and the second panel near the edges so that a planar lamp enclosing a hollow tube is produced. The fluorescent layer is deposited on the interior surface of the first and second panel, respectively. The distributed electrodes and the common electrode are mounted on each side inside the hollow space of the planar lamp adjacent to the side panels. The distributed electrodes are aligned on a straight line facing the common electrode. Each distributed electrode has a length smaller than the common electrode. Each voltage converter is electrically coupled to the common electrode as well as one and only one distributed electrode. All voltage converters are electrically coupled to the signal generator.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
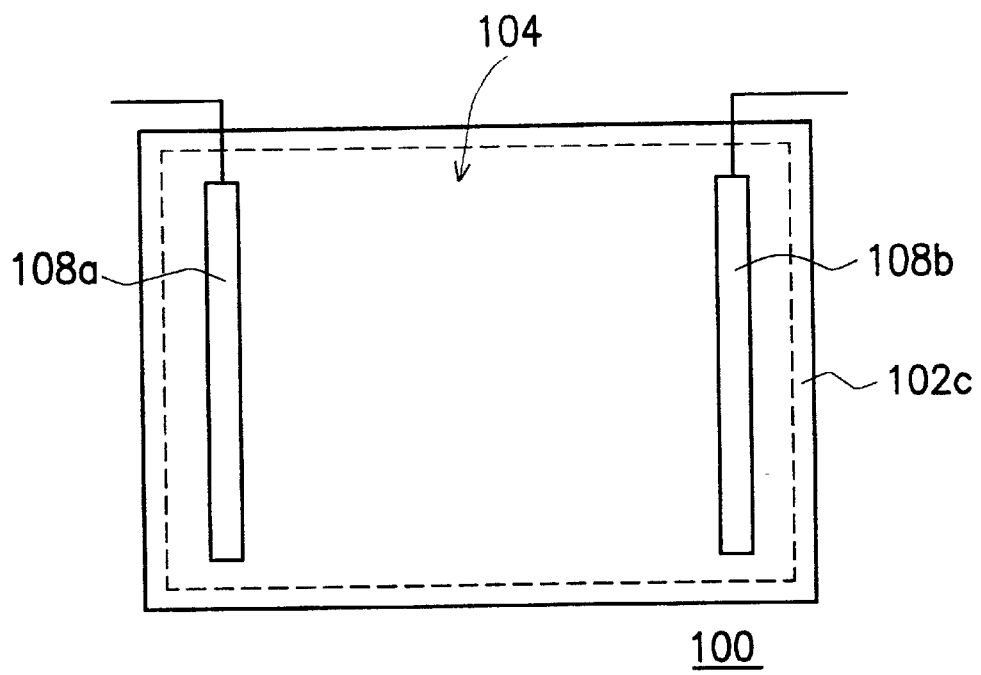
FIGS. 1A and 1B are the respective front view and the cross-sectional top view of a conventional planar fluorescent lamp.
Figure 1B:
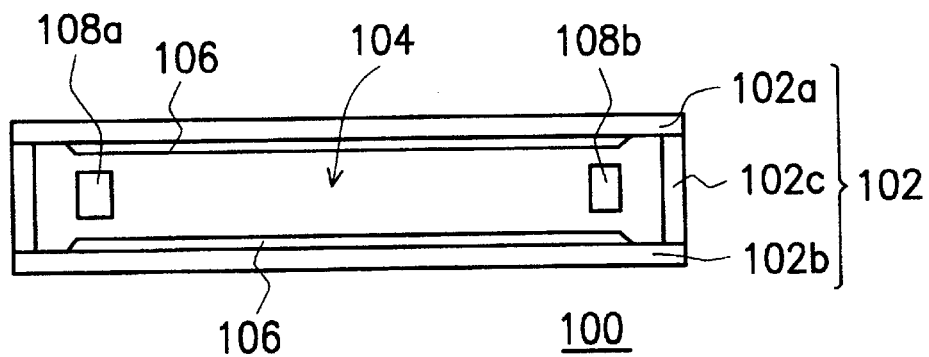
Figure 2:
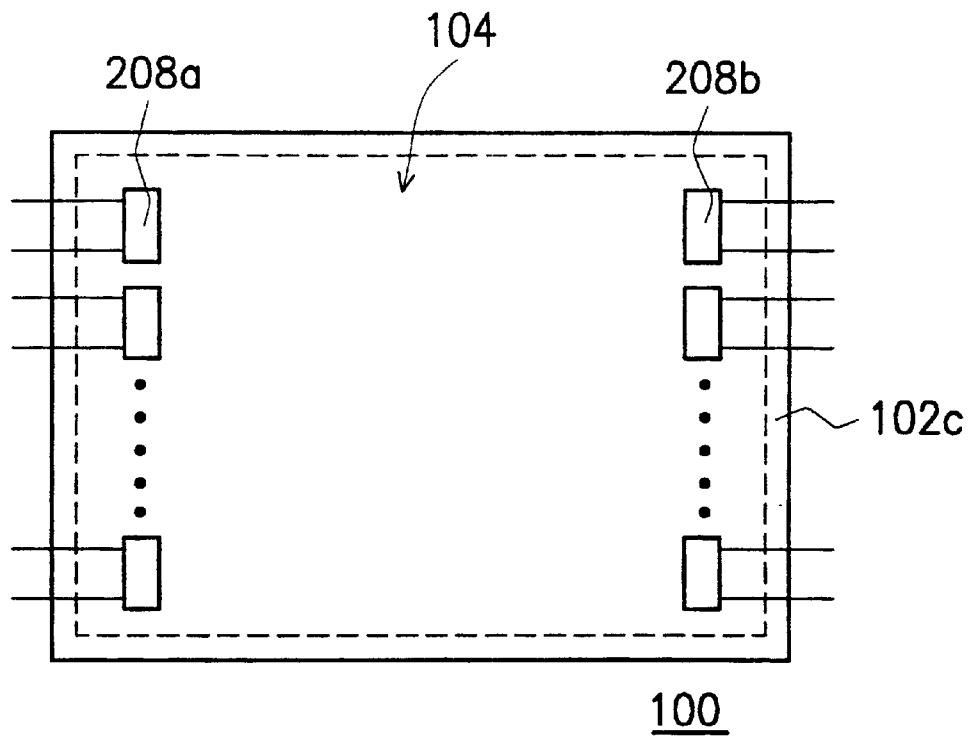
FIG. 2 is a side view showing the internal structure of another conventional planar fluorescent lamp.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
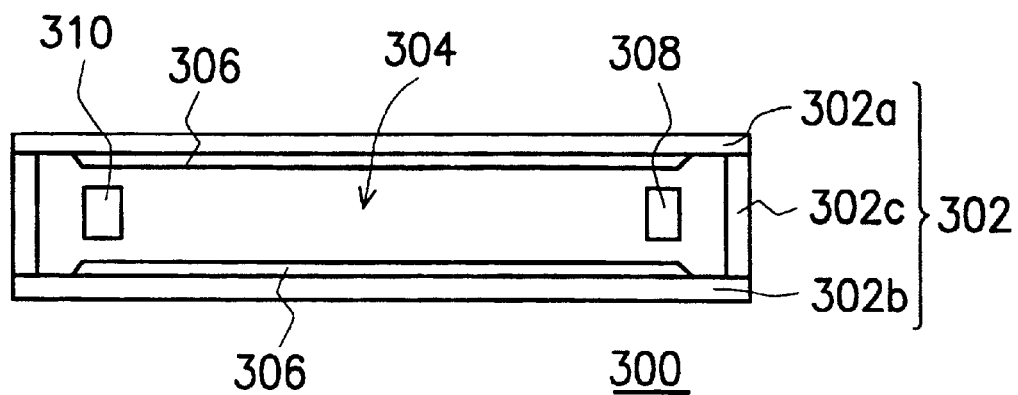
FIG. 3A is a cross-sectional view showing the internal structure of a planar fluorescent lamp according to one preferred embodiment of this invention.
Figure 3B:
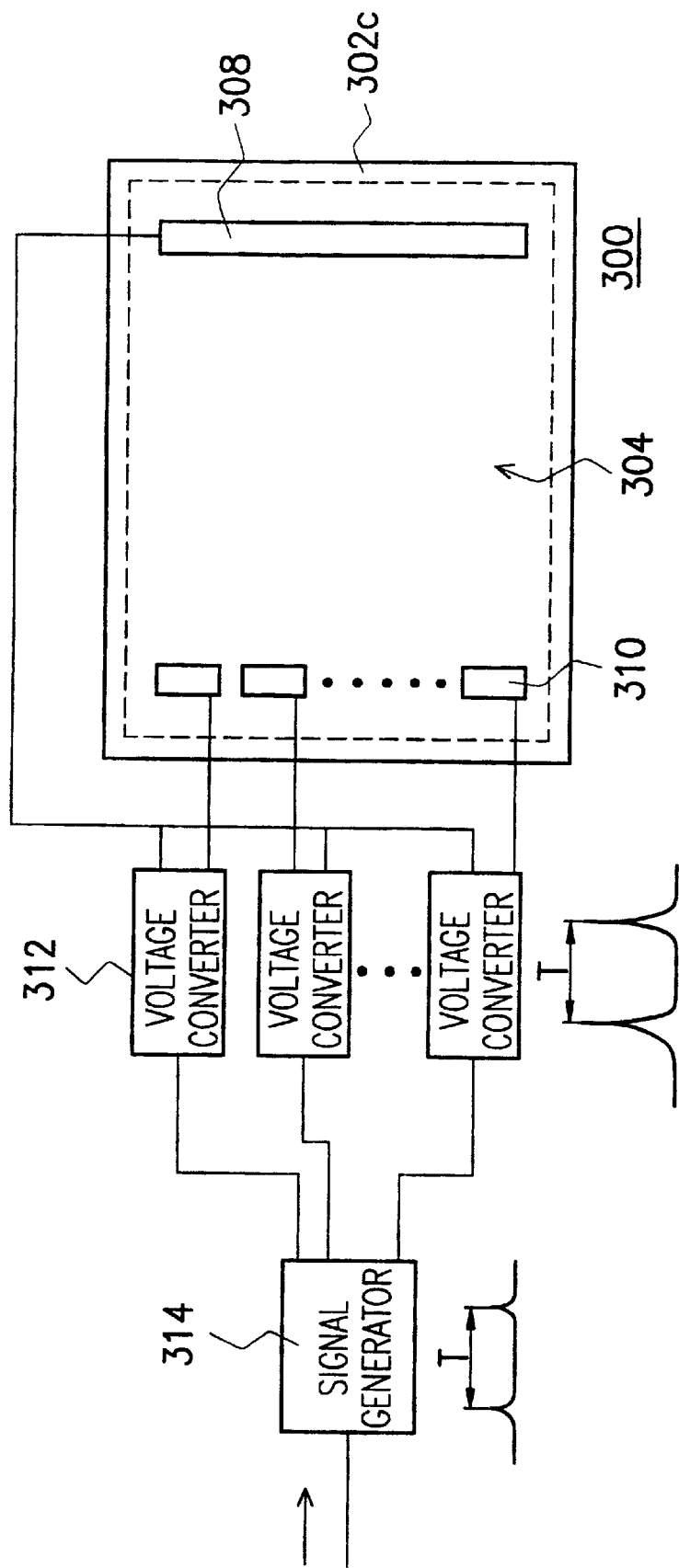
FIG. 3B is a front view showing the devices constituting a synchronous switching device and the internal structure of a planar fluorescent lamp according to one preferred embodiment of this invention.

FIG. 3A is a cross-sectional view showing the internal structure of a planar fluorescent lamp according to one preferred embodiment of this invention. FIG. 3B is a front view showing the devices constituting a synchronous switching device and the internal structure of a planar fluorescent lamp according to one preferred embodiment of this invention.

The synchronous switching device of this invention provides the necessary control for the planar fluorescent lamp at the back of a large surface LCD panel so that the entire LCD panel is illuminated to a uniform brightness level. The synchronous switching device and fluorescent lamp system as shown in FIG. 3B includes a common electrode 308, a plurality of distributed electrodes 310, a plurality of voltage converters 312 that each correspond to a distributed electrode and a signal generator 314. The fluorescent lamp 300 as shown in FIG. 3A is structurally similar to the conventional fluorescent lamp shown in FIG. 1A. The fluorescent lamp 300 has a planar fluorescent tube bounded by a first panel 302a, a second panel 302b and 2 side panels 302c.

The first panel 302a and the second panel 302b of the fluorescent lamp 300 are parallel to each other. The side panels 302c are inserted between the first panel 302a and the second panel 302b near the edges so that a planar lamp 302 that encloses a hollow tube 304 is produced. The fluorescent layer 306 is deposited on the interior surface of the first panel 302a and second panel 302b, respectively.

The distributed electrodes 310 and the common electrode 308 are positioned near the opposite ends within the hollow tube 304 adjacent to the side panels 302c. The distributed electrodes 310 are aligned along a straight line and facing the common electrode 308. Each distributed electrode 310 has an individual identical length that is shorter than the length of the common electrode 308. Each distributed electrode 310 has a length of between 0.5 cm to 10 cm, preferably about 5 cm. The voltage converters 312 can be voltage amplifiers or a transformer, for example. The number of voltage converters 312 is the same as the number of distributed electrodes 310 used. Each voltage converter 312 is electrically coupled to the common electrode 308 and one of the distributed electrodes 310. It should be noted that each voltage converter 312 is electrically connected to one and only one distributed electrode 310. All voltage converters 312 are electrically coupled to the signal generator 314.

To operate the synchronous switching device, a voltage signal is input to the signal generator 314. The signal generator 314 generates a plurality of synchronous voltage signals having a voltage between a few volts to a few tens of volts. These synchronous voltage signals are transmitted to various voltage converters 312 where the voltage is amplified to a very high voltage such as several thousand volts. In other words, the high voltage synchronous signal produced by the voltage converter 312 has the same signal cycle T as the output signal from the signal generator 314 but a different peak value. These high voltage synchronous signals are applied to the respective distributed electrodes 310 and the common electrode 308 so that electrons discharge across the electrodes to produce the lighting effect of the fluorescent lamp 300.

Since the combined length of all the distributed electrodes 310 is shorter than width of the fluorescent lamp 300, instantaneous voltage at various distributed electrodes 308 is identical when high voltages are applied. Thus, electric arcs between neighboring electrodes are suppressed. On the other hand, by providing identical synchronous high voltage signal from the distributed electrodes 310 to an opposite common electrode 308, the entire surface of the planar fluorescent lamp lights up simultaneously. Hence, bright and uniform light is produced across the panel. Furthermore, the planar fluorescent lamp controlled by the synchronous switch can serve as back light for a large surface LCD panel. In fact, the planar fluorescent lamp for providing necessary illumination to a LCD panel can have a corner-to-corner diagonal dimension greater than 18 inches.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous switching device for a fluorescent lamp, comprising:
   a common electrode;
   a plurality of distributed electrodes aligned in a straight line facing the common electrode, wherein each distributed electrode has a length shorter than that of the common electrode;
   a plurality of voltage converters, each connected to a distributed electrode, for providing a synchronous signal; and
   a signal generator connected to the voltage converters for providing synchronous voltage signals, wherein the voltage converters are able to produce identical high voltage synchronous signals.

2. The device of claim 1, wherein each distributed electrode has a length of about 0.5 cm to 10 cm.

3. The device of claim 1, wherein each distributed electrode has a length of about 5 cm.

4. The device of claim 1, wherein the voltage converters include voltage amplifiers.

5. The device of claim 1, wherein the voltage converters include transformers.

6. A planar fluorescent lamp, comprising:
   a first panel;
   a second panel parallel to the first panel;
   a pair of side panels between the first panel and the second panel and attached to opposite edges of the first and the second panel such that the first panel, the side panels and the second panel encloses a hollow space;
   a fluorescent layer coated on the interior-facing surfaces of the first and the second panel;
   a common electrode mounted on one side of the hollow space;
   a plurality of distributed electrodes aligned in a straight line and mounted on another side of the hollow space facing the common electrode;
   a plurality of voltage converters, each connected to a distributed electrode, for providing a synchronous signal; and
   a signal generator connected to the voltage converters for providing synchronous voltage signals so that the voltage converters are able to produce identical high voltage synchronous signals.

7. The device of claim 6, wherein each distributed electrode has a length between 0.5 cm to 10 cm.

8. The device of claim 6, wherein each distributed electrode has a length of about 5 cm.

9. The device of claim 6, wherein the voltage converters include voltage amplifiers.

10. The device of claim 6, wherein the voltage converters include transformers.

* * * * *